Patented Dec. 5, 1950

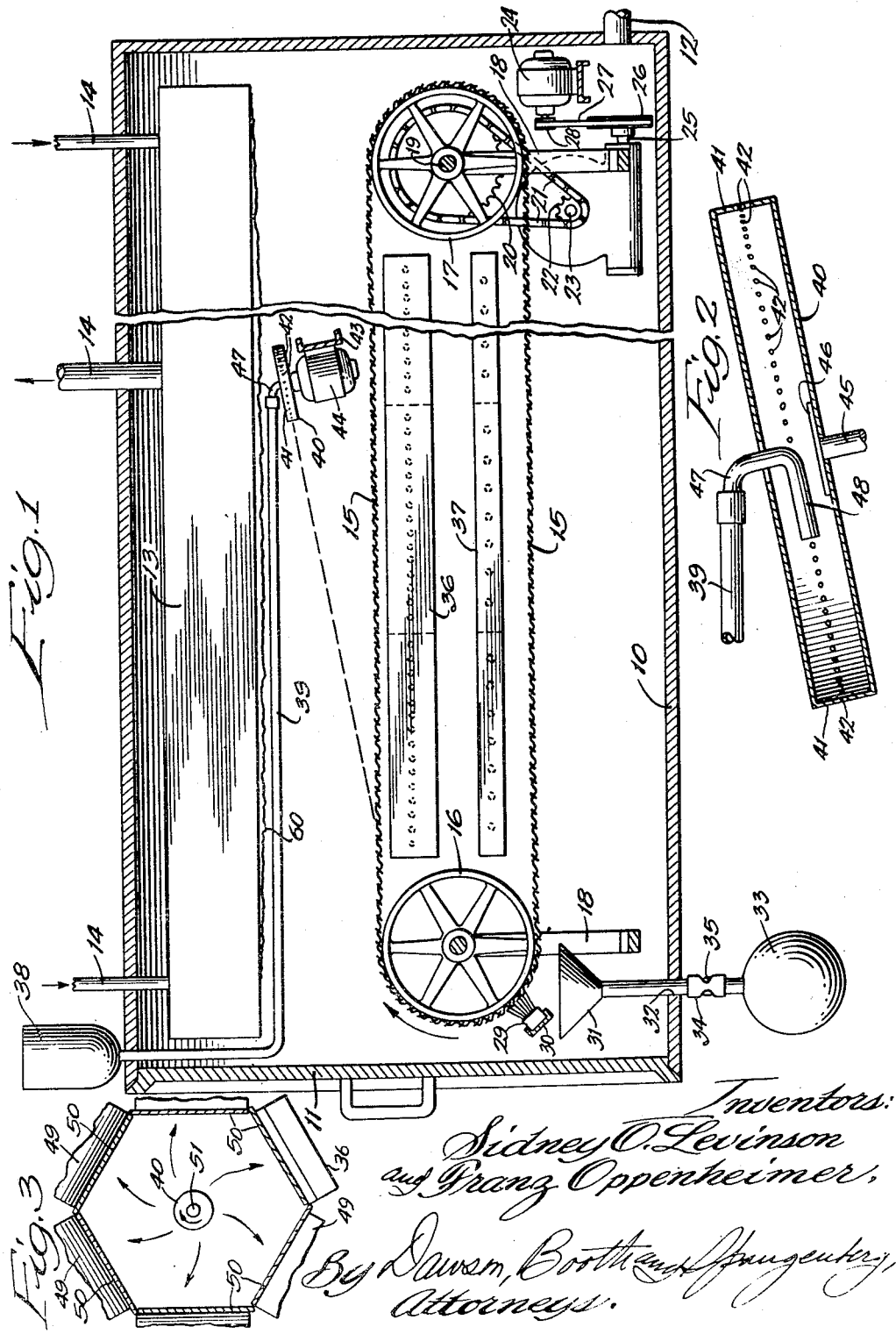

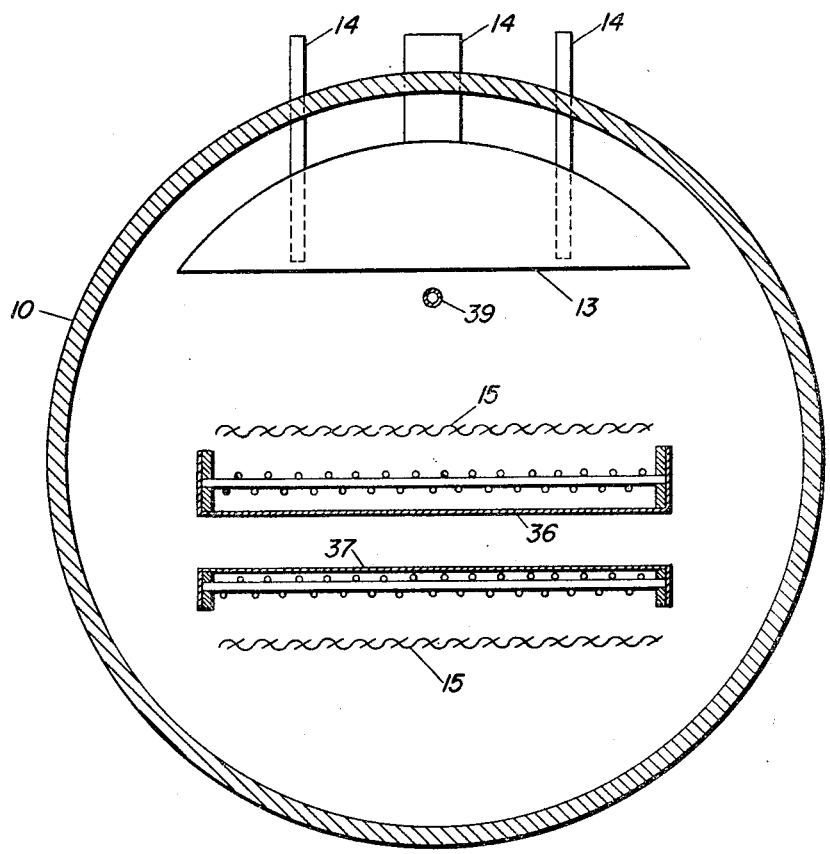

2,533,125

UNITED STATES PATENT OFFICE 2,533,125

APPARATUS FOR DESICCATION BY ICE SUBLIMATION

Sidney O. Levinson and Franz Oppenheimer, Chicago, Ill., assignors to Michael Reese Research Foundation, a non-profit corporation of Illinois Application February 16, 1946, Serial No. 648,173

6 Claims. (Cl. 34—76)

This invention relates to a drying method and is particularly useful in the drying of juices of fruits, vegetables and the like.

The invention is highly useful in the drying of orange juice.

This application constitutes a continuation-in-part of our copending application, Serial No. 454,100 for Drying of Juices of Fruits, Vegetables and the Like, now abandoned.

An object of the invention is to provide an apparatus for continuously drying the juices of fruits, vegetables and other like substances, particularly orange juice, to produce a dry product that can be readily reconstituted upon the addition of water to form fresh juice. Yet another object is to provide a method and means for drying juices and the like without substantial change of the juices except with respect to the removal of moisture therefrom. A further object is to subject the frozen juices of fruits, vegetables and like frozen materials to vacuum and radiant energy while maintaining the juices in a solid state so that the moisture is removed from the material without liquifying the juice. Other specific objects and advantages will appear as the specification proceeds.

Figure 1 is a broken vertical sectional view of apparatus employed in the operation of our invention; Fig. 2, a vertical sectional view on an enlarged scale of the centrifugal device employed for applying to the juices, etc., to the carrier web; Fig. 3, a transverse sectional view of the carrier means and juice applying means whereby all of the juices are recovered; and Fig. 4, a transverse sectional view of the apparatus shown in Fig. 1.

The invention contemplates the subjecting of frozen juices and the like to radiant energy which imparts heat thereto while, at the same time, maintaining the frozen juice under a vacuum sufficiently high to keep the same in a solid state while the moisture is being vaporized and removed.

In the frozen state, the moisture or water of the juice has an appreciable vapor pressure and under vacuum the vapor from the same may be removed. However, as the vaporization proceeds, heat is taken up by the moisture which is vaporized, and in an adiabatic condition the temperature of the frozen mass will be quickly lowered until it no longer possesses a substantial vapor pressure. Under the present process, the material is fed continuously into the vaporizing zone and heat is imparted to the frozen mass by means of radiant energy which is absorbed thereby.

The radiant energy is preferably applied to the frozen material by subjecting the same to infra-red rays which penetrate the frozen juice and are absorbed thereby. Preferably, the frozen juice is supported by a conveyor which is permeable to the infra-red rays and which does not substantially absorb the rays. Instead of infra-red rays, high frequency, short radio waves of the type used in diathermy treatments may be satisfactorily used. It will also be understood that other radiant energy adaptable to the purposes described herein may be employed.

In the construction of apparatus for continuous desiccation of orange juice, etc., we wish to provide conditions as closely related to the ideal as feasible. The ideal conditions are as follows; if the film of frozen material is infinitely thin, the surface infinitely large and unrestricted, the temperature constant and the vacuum perfect, the drying would be instantaneous. The greater the departure from the ideal, the greater the time required for desiccation.

For the purpose of clarity, the invention will be described hereinafter as applied to the drying of one specific material, namely, orange juice. Orange juice does not lend itself easily to desiccation by ice sublimation. Orange juice contains from 9 percent to 16 percent of sugar in solution and, depending on the method of preparation, a certain amount of fibrous and cellulose material. The presence of such inert material is beneficial in the process of drying orange juice because the fibers separate the desiccated sugar from frozen orange juice during the process of desiccation. Otherwise, under the laws of physics (the principle of the eutectic point of a three-phase system), the dried sugar would have to melt ice crystals which it touches.

In the illustration given in the drawing, 10 designates a casing providing a closed chamber openable at its forward end. The chamber 10 is hermetically sealed at its forward end by a closure 11. 12 designates a vacuum conduit connected through a safety trap to a high vacuum pump.

Within the upper portion of the chamber is a cold plate 13 which is refrigerated through lines 14 so that a temperature of —40° C. may be obtained.

Within the tank or chamber is an endless belt or web 15 carried by rollers 16 and 17 which are supported upon the frame 18. The shaft 19, which carries roller 17, is equipped with a sprocket wheel 20. A drive chain 21 connects the sprocket 20 and a sprocket 22 carried by shaft 23.

Any suitable means for driving the shaft 23 may be employed. In the illustration given, the shaft 23 is driven through reduction members by the motor 24. Upon shaft 23 is mounted a worm gear meshing with the worm 24 on shaft 25. Shaft 25 is provided with a pulley 26 which is connected by the belt 27 to the motor driven pulley 28.

Any suitable means for removing the dried material may be provided. In the illustration given, we provide a brush member 29 mounted in the bracket 30, the bristles of the brush engaging the web 15 and serving to remove the dried material. The brush may be reciprocated to increase its efficiency in removing the material. The dried material thus freed from the web 15 falls into a trough 31 and outlet conduit 32. The conduit 32 is connected to a receptacle 33 by a flexible tube 34 which may be formed of rubber or the like and which may be sealed by the means of a spring clip 35 to prevent loss of vacuum when the receptacle 33 is removed.

Supported by frame A between the webs 15 are the heaters 36 and 37. In the illustration given, the heater 36 is shown formed by Nichrome coils. The coils are so calculated as to wire lengths and size that they reach a certain temperature at a given voltage at the selected vacuum.

The heater 37 is similar to heater 36 but has a lesser number of Nichrome coils. For example, in one satisfactory structure, the upper heater 36 consists of 60 Nichrome coils and the lower heater 37 consists of 28 Nichrome coils; this arrangement being found satisfactory for a vacuum of 100 microns of water.

In the illustration given, the liquid orange juice is placed in a container 38 and is brought into the machine through a stainless steel line 39 and deposited as an even film by a centrifugal device 40. The centrifugal device 40 may consist of any spinner wheel upon which the juice is deposited and which throws the juice in a fine mist toward the belt 15. In the construction shown in the drawings, the centrifugal member 40 consists of a casing providing a hollow chamber 41 having discharge ports 42 in its outer periphery. A cross beam 43 carried by the casing walls 10 supports a motor 44 and the shaft 45 of the motor is provided with a flange 46 welded directly to the inner casing wall of the centrifugal member 40.

The pipe 39 is provided at its lower end with a nozzle member 47 which has an outlet portion 48 turned into a position parallel with the casing walls of the member 40, as shown more clearly in Fig. 2.

In the operation of the device the cold plate 13 is first refrigerated to a suitable low temperature say, for example, to −40° C., and then the drying chamber is exhausted to a selected vacuum, say, of approximately 100 microns. Freshly squeezed orange juice is then introduced into the storage bottle 38 and is drawn under the vacuum into the centrifugal device 40. The centrifugal member 40 is rotated at speed sufficient to throw the juice in a fine spray toward the forward end of the belt 15 as indicated by dotted lines in Fig. 1.

Before starting the spray operation, the belt 15 is set into motion by the motor 24 and is caused to travel at a slow speed, say at a speed of one rotation in 46 minutes. Simultaneously with the starting of the belt 15, we turn on the heater to warm up the system.

After the establishment of a heat equilibrium, the spray may be turned on to deposit a film of frozen orange juice and the heaters are turned on. Preferably, the first ten coils of the upper heater are subjected to a high wattage input, say, for example, 45 watts per coil so that they reach an approximate temperature of 600° C. The next ten coils operate at a current of 15 watts per coil and at a temperature of approximately 400° C. The next 20 coils are heated with 10 watts each and their temperature is approximately 300° C. The last twenty coils operate at 5 watts each and at an approximate temperature of 250° C. Thus, in the example, the total heat supplied to the upper heater is approximately 900 watts.

The belt on web 15 is chosen mainly for its ability to permit penetration of the radiant heat from the heaters 36 and 37. In the specific illustration given, a belt made of woven nylon cloth is employed because of its effective penetration by infra-red irradiation, etc. Nylon has a very low absorption factor for the infra-red irradiation; it has great mechanical strength and is not affected by exposure to heat or cold. It will be understood that any other suitable material permeable to such rays may be employed.

While the frozen orange juice on the belt travels over the upper heater 36, it is desiccated to a final moisture content of approximately 10 percent and it then travels backwardly and is exposed to the radiation of the lower heater 37 of 28 coils, preferably heated with a current of 56 watts. It will be understood that the specific conditions described herein in connection with the drying of orange juice may be modified widely to meet the characteristics of different types of orange juice, vegetable juice, etc. In the illustration given, when the orange juice reaches the front roller, it is completely dried and contains less than 0.2 percent moisture.

The reciprocating brush 29 removes the orange juice powder from the web 15 and allows it to fall into a trough receptacle 31 which may be heated to a temperature of approximately 35° C. From the trough the orange juice powder will fall into the receiving vessel 33 upon the removal of the clamp 35. When the clamp 35 is placed into position to seal the rubber tube 34, the flask 33 may be removed without affecting the vacuum within the chamber.

The process, as described, presents a continuous process for the desiccation of orange juice and may be operated over long periods of time.

*Specific example*

As a specific example, the following may be set out. A vacuum tank corresponding to the structure 10 in the drawing and which was three feet in diameter and four feet long was connected through a safety trap 7 by a vacuum line 12 to a high vacuum pump. The cold plate in the upper portion of the tank was refrigerated to a temperature of −40° C. A vacuum in the tank of approximately 100 microns Hg was produced. Structures like that shown in Fig. 1 were employed, the belt 15 being formed of nylon cloth. The spinning disc was four inches in diameter and had approximately 100 holes 42 ($\frac{1}{32}$" diameter) close to the perimeter. The disc or member 40 was rotated at a speed of 1750 R. P. M. and was located 22 inches from the belt 15. Approximately ten per cent of the spray was deposited on the belt which was twelve and one-half inches wide.

While traveling from the disc to the belt, the temperature of the orange juice drops due to evaporation, and when deposited on the belt, its temperature is approximately −31° C. The speed of rotation and the distance from the belt were found to be important factors because the orange juice crystals should not be packed too tightly on the belt, but should be spread so as to form a fluffy and porous mass during the drying operation. If the orange juice is too tightly packed, melting of the frozen juice becomes likely because the water vapor has less chance to escape from the frozen mass, and the vapor pressure builds up inside the frozen mass.

The upper heater 36 consisted of 60 Nichrome coils, and the lower heater 37 consisted of 28 Nichrome coils. The first ten coils were heated to an approximate temperature of 600° C., the next ten at a temperature of 400° C., the next twenty at a temperature of 300° C., and the last twenty at an approximate temperature of 250° C., the total current supplied to the upper heater being approximately 900 watts. Thus, there was a decreasing coil temperature during the main drying operation. The lower 28 coils in heater 37 were heated with a current of 56 watts.

In the operation of the above apparatus in the specific example, freshly squeezed orange juice was introduced into the storage bottle 38 which held approximately 750 c. c. after the chamber had been brought to a heat equilibrium by turning on the heaters temporarily. When the spray formed a film of frozen orange juice on the belt, heaters were turned on to the temperatures above referred to. The orange juice, which is pulled into the tank by the vacuum, was introduced into the machine at a rate of approximately ten liters per hour, and one-tenth of the spray was deposited on the moving belt. The belt was operated at a speed of one rotation in 46 minutes.

During the operation, the temperature of the cold plate was maintained at about −40° C. and the vacuum at about 100 microns. The frozen juice upon the web gradually changed into a porous, orange-colored sheet as it advanced with the web 15 over the upper heater 36. The material remained tightly adhered to the web until it reached the brush 29 which removed it into trough 31. The trough 31 was heated by electric resistance elements (not shown) to a temperature of approximately 35° C., and the powder falls freely through the outlet pipe 32 into the receptacle 33. The recovered product is substantially completely dry, containing less than 0.2 per cent moisture. It is fluffy and highly porous and of orange color. Upon the addition of water, it became immediately reconstituted as fresh orange juice, having identically the same taste characteristics. It contains the original vitamins, enzymes, volatile oils and other properties of the original orange juice.

In the form of apparatus described, it will be noted that the distance between the belt and the cold plate is quite short, and the water vapor travels a very short distance before it is removed by crystallization on the cold plate.

The condensed material on the plate 13 is indicated by the numeral 60.

The structure shown in Fig. 1 may be operated as a batch operation, the frozen material collecting upon the inner walls of the apparatus being removed after the operation.

*Multiple belt structure*

In the preferred form of operation, we employ a large number of rollers 49 carrying belts 50, as shown more clearly in Fig. 3 of the drawing. In this structure, preferably the belts are brought together or in slightly overlapping relation so that they provide a continuous belt surface about the centrifugal device 40. The orange juice is fed to the centrifugal device 40 through a pipe 51 which extends at right angles to the member 40 and thus extends longitudinally of the chamber provided by the multiple belts.

In the illustration given in Fig. 3, the heater 36 may be placed under each of the belts 50 in exactly the same arrangement as the heater is supported in Fig. 1. We prefer to use, in the structure shown in Fig. 3, the same belt-driving means and the same heating structure as is shown in Fig. 1 for the single belt there employed. Such heating and belt-driving structure will be duplicated for each of the belts 50 shown in Fig. 3.

In the operation of the structure shown in Fig. 3, the orange juice or other juice is fed through the pipe 51 which extends freely into the member 40, as illustrated in Fig. 2. The member 40 is supported independently of the member 50 as is also true of the structure shown in Fig. 2. The member 40 discharges orange juice or the like in a continuous spray film upon the surrounding belts 50, and all of the orange juice is thus recovered upon the belts.

If a single belt is employed, illustrated in Fig. 1, means must be employed for recovering the orange juice which does not strike the belt 15 and for recovering it to the receptacle 38. With, however, the structure shown in Fig. 3, there is no need for such recovery because all the orange juice is collected on the belts 50. If a different form of spray device is employed which deposits all of the orange juice upon the single belt 15, no recovery means are, of course, needed.

The infra-red rays which are used to impart heat to the material are preferably relatively long rays so that the frozen juice will be readily penetrated by the rays and the frozen mass will be substantially uniformly heated. Rays which are given off by a black body glowing at a temperature of between 150° C. and 800° C. have been found to be suitable for the purpose of the invention. Instead of using Nichrome coils, as described, other suitable means, such as gaseous discharge tubes, etc., may be employed for generating the rays.

Although infra-red rays having a maximum intensity at a wavelength between 70,000 Å and 7800 Å may be used, it is preferred that the wavelength of maximum intensity be between 55,000 Å or 5.5$\mu$ and 20,000 Å or 2.9$\mu$. These wavelengths correspond to the maximum intensity of infra-red rays emitted by black bodies at the approximate temperatures of 250° C. and 1000° C. respectively. The preferred range is particularly advantageous when the infra-red rays must pass through a glass container to reach the frozen material. Infra-red rays having a maximum intensity at a wavelength of approximately 40,000 Å or 4$\mu$ have been found to be particularly suitable in the practice of the invention.

While we have described the invention, for the purpose of illustration, in connection with the treatment and drying of orange juice, the process may also be applied to any other juices of fruits, vegetables, and liquid materials containing sugar or other types of materials which change readily upon drying and are, therefore, difficult to dry. It will be apparent that the details herein set forth may be widely varied by those skilled in the art without departing from the spirit of our invention.

We claim:

1. An apparatus for the desiccation of moisture-bearing materials, a casing providing a closed chamber, means for maintaining the chamber under vacuum, an endless belt in said chamber mounted for continuous movement, said belt being permeable by infra-red rays without substantial absorption of the rays, means for moving said belt, means for directing infra-red rays through said belt and into the material on said belt, and means for impinging upon said belt a thin film of frozen material, said means comprising a cylinder having its peripheral portion with outlet openings, means for rotating the cylinder and means comprising a pipe extending freely into said cylinder and having a discharge portion turned toward said outlet openings within said cylinder.

2. An apparatus for the desiccation of orange juice and the like, a casing providing a closed chamber, a cold plate in the upper portion of said chamber, means for refrigerating said plate, means for maintaining the chamber under vacuum, an endless belt in said chamber mounted for continuous movement, said belt being permeable to infra-red rays without absorption of the rays, means for moving said belt, a rotary member mounted above said belt and below said plate, means for supplying juice to said rotary member, means for rotating said rotary member, means for supplying infra-red rays through said belt to the top surface of said belt, and means for removing dried residue from said belt.

3. An apparatus for the desiccation of orange juice and the like, a casing providing a closed chamber, a cold plate in the upper portion of said chamber, means for maintaining the chamber under vacuum, an endless belt in said chamber below said plate and mounted for continuous movement, said belt being permeable to infra-red rays without absorption of the rays, means for moving said belt, a motor supported between said plate and belt, a rotary member driven by said motor, means supported independently of said motor for supplying the juice to said rotary member, said rotary member being angularly related to said belt so as to deliver a thin film of juice toward the opposite end of said belt, means for subjecting the juice on said belt to infra-red rays passed through said belt, and means for removing dried residue from said belt.

4. In apparatus for the desiccation by ice sublimation of moisture-containing materials, a casing providing a closed chamber, means for maintaining the chamber under vacuum, an endless conveyor belt in said chamber mounted for continuous movement and permeable to radiant energy, means for moving said conveyor, means for spraying upon said belt a film of frozen material, said spraying means being spaced from the belt and directing the spray substantially longitudinally of the belt, and means for directing radiant energy into said film.

5. In apparatus for the desiccation by ice sublimation of moisture-containing materials, a casing providing a closed chamber, means for maintaining the chamber under vacuum, an endless conveyor belt in said chamber mounted for continuous movement and permeable to radiant energy, means for moving said conveyor, means for spraying upon said belt a film of frozen material, said spraying means being spaced from the belt and directing the spray upon the belt at an acute angle thereto, and means for directing radiant energy into said film.

6. In apparatus for the desiccation by ice sublimation of moisture-containing materials, a casing providing a closed chamber, means for maintaining the chamber under vacuum, an endless conveyor belt in said chamber mounted for continuous movement and permeable to radiant energy, means for moving said conveyor, and means for spraying upon said belt a film of frozen material, said spraying means being spaced from the belt and directing the spray substantially longitudinally of the belt, and in a direction opposite to the movement of the belt.

SIDNEY O. LEVINSON.
FRANZ OPPENHEIMER.

REFERENCES CITED

The following references are of record in the file of this patent:

UNITED STATES PATENTS

| Number | Name | Date |
|---|---|---|
| 864,978 | Morel | Sept. 3, 1907 |
| 888,257 | Passburg | May 19, 1908 |
| 1,275,547 | Forrest | Aug. 13, 1918 |
| 1,580,658 | Field | Apr. 13, 1926 |
| 1,609,849 | Wagner | Dec. 7, 1926 |
| 1,744,884 | Greiner | Jan. 28, 1930 |
| 1,970,956 | Elser | Aug. 21, 1934 |
| 2,100,151 | Tietz | Nov. 23, 1937 |
| 2,215,265 | Flosdorf | Sept. 17, 1940 |
| 2,253,319 | Batterman | Aug. 19, 1941 |
| 2,287,795 | Hall | June 30, 1942 |
| 2,292,447 | Irwin, Jr. | Aug. 11, 1942 |
| 2,302,253 | Reichel et al. | Nov. 17, 1942 |
| 2,345,548 | Flosdorf | Mar. 28, 1944 |
| 2,360,257 | Muller et al. | Oct. 10, 1944 |
| 2,388,917 | Hormel | Nov. 13, 1945 |
| 2,396,561 | Flosdorf | Mar. 12, 1946 |
| 2,400,748 | Flosdorf | May 21, 1946 |
| 2,411,152 | Folsom | Nov. 19, 1946 |
| 2,414,940 | Flosdorf | Jan. 28, 1947 |

FOREIGN PATENTS

| Number | Country | Date |
|---|---|---|
| 118,431 | Australia | Apr. 19, 1944 |

OTHER REFERENCES

Convection Drying and Drying Calculations by V. P. Victor Heating and Ventilating, Dec. 1944, pages 67 to 81.